United States Patent
Hungerink et al.

(10) Patent No.: US 10,676,142 B2
(45) Date of Patent: Jun. 9, 2020

(54) FIFTH WHEEL ASSEMBLY SAFETY COUPLING ARRANGEMENT

(71) Applicant: SAF-HOLLAND, Inc., Muskegon, MI (US)

(72) Inventors: Gerald Hungerink, Holland, MI (US); Daniel C. Colby, Grand Rapids, MI (US)

(73) Assignee: SAF-HOLLAND, Inc., Muskegon, MI (US)

( * ) Notice: Subject to any disclaimer, the term of this patent is extended or adjusted under 35 U.S.C. 154(b) by 259 days.

(21) Appl. No.: 15/837,700

(22) Filed: Dec. 11, 2017

(65) Prior Publication Data

US 2019/0176912 A1 Jun. 13, 2019

(51) Int. Cl.
*B62D 53/10* (2006.01)
*F15B 15/06* (2006.01)
*F15B 11/10* (2006.01)

(52) U.S. Cl.
CPC .............. *B62D 53/10* (2013.01); *F15B 11/10* (2013.01); *F15B 15/06* (2013.01); *F15B 2211/7053* (2013.01)

(58) Field of Classification Search
CPC ........... B62D 53/10; F15B 11/10; F15B 15/06
USPC ......................................................... 280/433
See application file for complete search history.

(56) References Cited

U.S. PATENT DOCUMENTS

| | | | | |
|---|---|---|---|---|
| 2,998,267 A | * | 8/1961 | Zajac | B62D 53/12 280/427 |
| 3,380,758 A | * | 4/1968 | Granning | B62D 53/0821 280/425.1 |
| 3,917,314 A | * | 11/1975 | Neal | B62D 53/0871 280/432 |
| 4,065,149 A | * | 12/1977 | Roth | B62D 53/0878 280/432 |
| 4,934,727 A | * | 6/1990 | Hawkins | B62D 53/0878 280/423.1 |
| 4,991,863 A | * | 2/1991 | Hosmer | B62D 53/0871 280/432 |
| 5,069,472 A | * | 12/1991 | Parr | B62D 53/12 280/433 |

(Continued)

OTHER PUBLICATIONS

The Hague; European Search Report; dated May 15, 2019.

*Primary Examiner* — Jacob D Knutson
(74) *Attorney, Agent, or Firm* — Price Heneveld LLP

(57) ABSTRACT

A fifth wheel assembly safety coupling arrangement includes a fifth wheel hitch including a top support surface and a recess configured to receive a kingpin member therein, a locking arrangement moveable between a locked position, wherein the kingpin is prevented from being removed from within the recess by the locking arrangement, and an unlocked position, wherein the kingpin is not prevented from being removed from within the recess by the locking arrangement, and a pneumatic cylinder assembly configured to receive a first pneumatic input from a first air supply exerting a first force on the pneumatic cylinder assembly, and a second pneumatic input from a second air supply exerting a second force on the pneumatic cylinder assembly, wherein the pneumatic cylinder assembly prevents the locking arrangement from moving from the locked position to the unlocked position when the sum of the biasing force and the first force is greater than the second force.

16 Claims, 7 Drawing Sheets

(56) References Cited

U.S. PATENT DOCUMENTS

| | | | |
|---|---|---|---|
| 5,176,396 A * | 1/1993 | Hawthorne | B62D 53/10 |
| | | | 280/434 |
| 5,456,484 A | 10/1995 | Fontaine | |
| 5,625,335 A * | 4/1997 | Kelly | B62D 53/12 |
| | | | 280/432 |
| 6,272,949 B1 * | 8/2001 | Jarvis | B62D 53/08 |
| | | | 74/569 |
| 7,510,203 B2 * | 3/2009 | Domine | B62D 53/061 |
| | | | 172/439 |
| 9,956,835 B2 * | 5/2018 | Dolesh | B60D 1/28 |
| 2007/0222185 A1 * | 9/2007 | Domine | B62D 53/061 |
| | | | 280/507 |
| 2016/0059649 A1 | 3/2016 | Dolesh | |

* cited by examiner

US 10,676,142 B2

FIFTH WHEEL ASSEMBLY SAFETY COUPLING ARRANGEMENT

BACKGROUND

The present invention is directed to a fifth wheel assembly between a towing vehicle, such as a semi-tractor, and a towed vehicle, such as a heavy-duty trailer, and in particular is directed to a fifth wheel assembly safety arrangement that ensures proper coupling of the towed vehicle to the towing vehicle while the towed vehicle is pneumatically coupled to the towing vehicle and the brake system associated with the towed vehicle is disengaged.

SUMMARY OF THE INVENTION

One embodiment includes a fifth wheel assembly safety coupling arrangement that includes a fifth wheel hitch member including a top support surface and a recess configured to receive a kingpin member therein, a locking arrangement moveable between a locked position, wherein the kingpin is prevented from being removed from within the recess by the locking arrangement, and an unlocked position, wherein the kingpin is not prevented from being removed from within the recess by the locking arrangement, a biasing arrangement exerting a biasing force on the locking arrangement from the unlocked position toward the locked position, and a pneumatic cylinder assembly configured to receive a first pneumatic input from a first air supply exerting a first force on the pneumatic cylinder assembly, and a second pneumatic input from a second air supply exerting a second force on the pneumatic cylinder assembly, wherein the pneumatic cylinder assembly prevents the locking arrangement from moving from the locked position to the unlocked position when the sum of the biasing force and the first force is greater than the second force.

Another embodiment includes a fifth wheel assembly safety coupling arrangement that includes a fifth wheel hitch plate including a top support surface and a recess configured to receive a kingpin member therein, a locking arrangement moveable between a locked position, wherein the kingpin is prevented from being removed from within the recess by the locking arrangement, and an unlocked position, wherein the kingpin is not prevented from being removed from within the recess by the locking arrangement, a first air supply, a second air supply in fluid communication with a brake arrangement of a towed vehicle, a biasing arrangement exerting a biasing force on the locking arrangement from the unlocked position toward the locked position and a pneumatic cylinder assembly receiving a first pneumatic input from the first air supply exerting a first force on the pneumatic cylinder assembly, and a second pneumatic input from the second air supply exerting a second force on the pneumatic cylinder assembly, wherein the pneumatic cylinder assembly prevents the locking arrangement from moving from the locked position to the unlocked position when the sum of the biasing force and the first force is greater than the second force.

The present inventive system for ensuring proper coupling of the towed vehicle to the towing vehicle significantly reduces the chance of an accidental uncoupling of the towed vehicle from the towing vehicle. This system may be easily retrofitted onto most vehicle configurations, is extremely reliable and durable, is capable of a long operating life, and is particularly well adapted for the proposed use.

These and other features, advantages, and objects of the fifth wheel assembly safety arrangement will be further understood and appreciated by those skilled in the art by reference to the following specification, claims, and appended drawings.

DETAILED DESCRIPTION OF THE PREFERRED EMBODIMENTS

Figure 1:
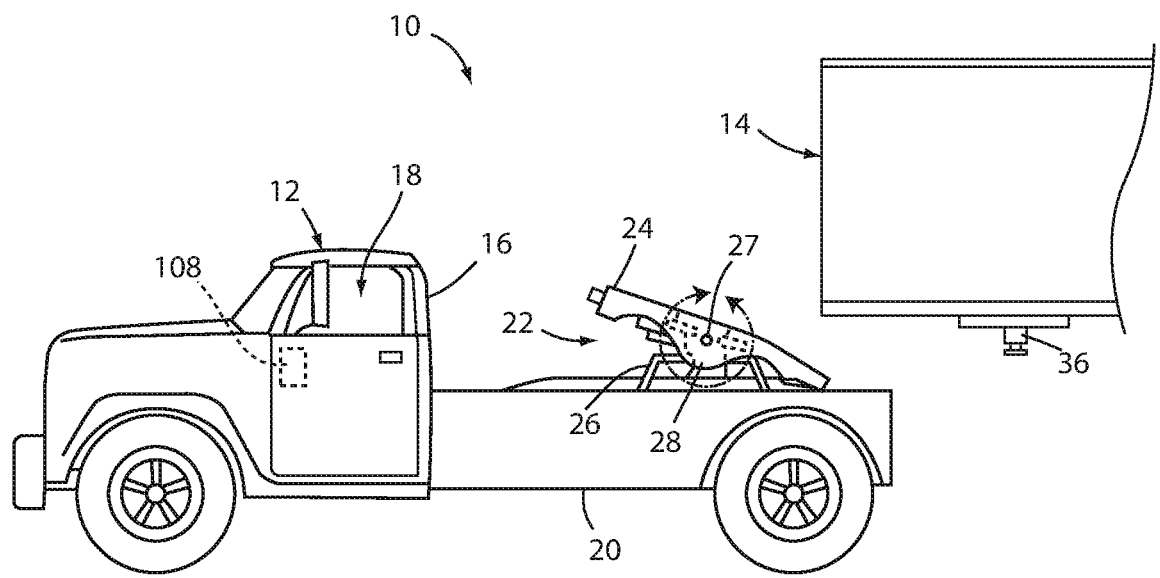
FIG. 1 is a side elevational schematic view of a truck and trailer combination that includes a fifth wheel safety coupling arrangement.
Figure 2:
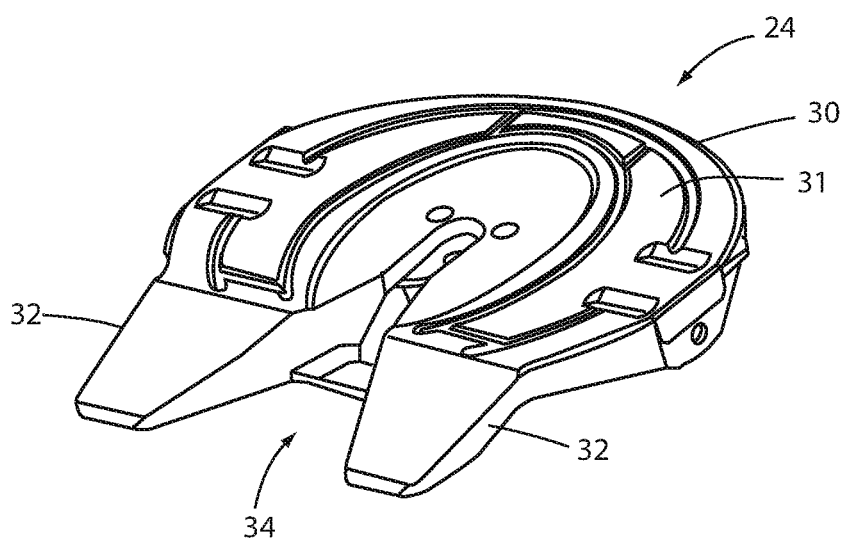
FIG. 2 is a top perspective view of a fifth wheel hitch plate assembly.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference 10 (FIG. 1) generally designates a tractor/trailer vehicle combination, including a towing vehicle 12, such as a semi-tractor, and a towed vehicle or trailer 14. In the illustrated example, the towing vehicle 12 includes a cab 16 defining an interior space 18, and a rearwardly-extending a frame assembly 20 supporting a fifth wheel assembly 22 thereon. The fifth wheel assembly 22 includes a fifth wheel hitch plate 24 pivotably supported above the frame assembly 20 by a mounting arrangement 26 such that the fifth wheel hitch plate 24 is pivotable about a pivot axis 27 in the directions 28. The fifth wheel hitch plate 24 (FIG. 2) includes a planar body portion 30 having a top support surface 31, and a pair of rearwardly-extending flanges 32 defining a throat 34 therebetween that is adapted to receive a kingpin 36 (FIG. 1) of the trailer 14 therein.

Figure 4:
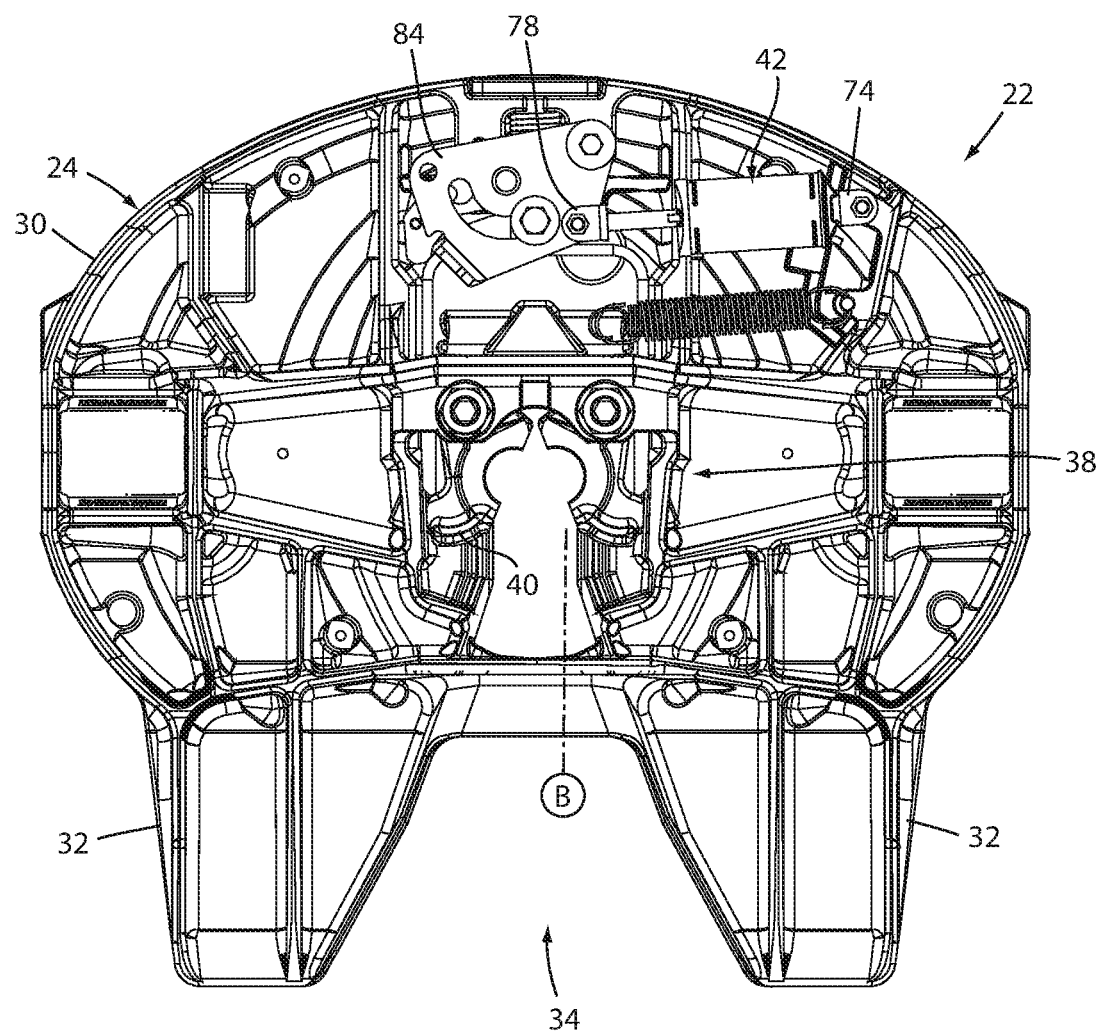
FIG. 4 is a bottom plan view of the fifth wheel hitch plate assembly with a locking arrangement in an unlocked position
Figure 5:
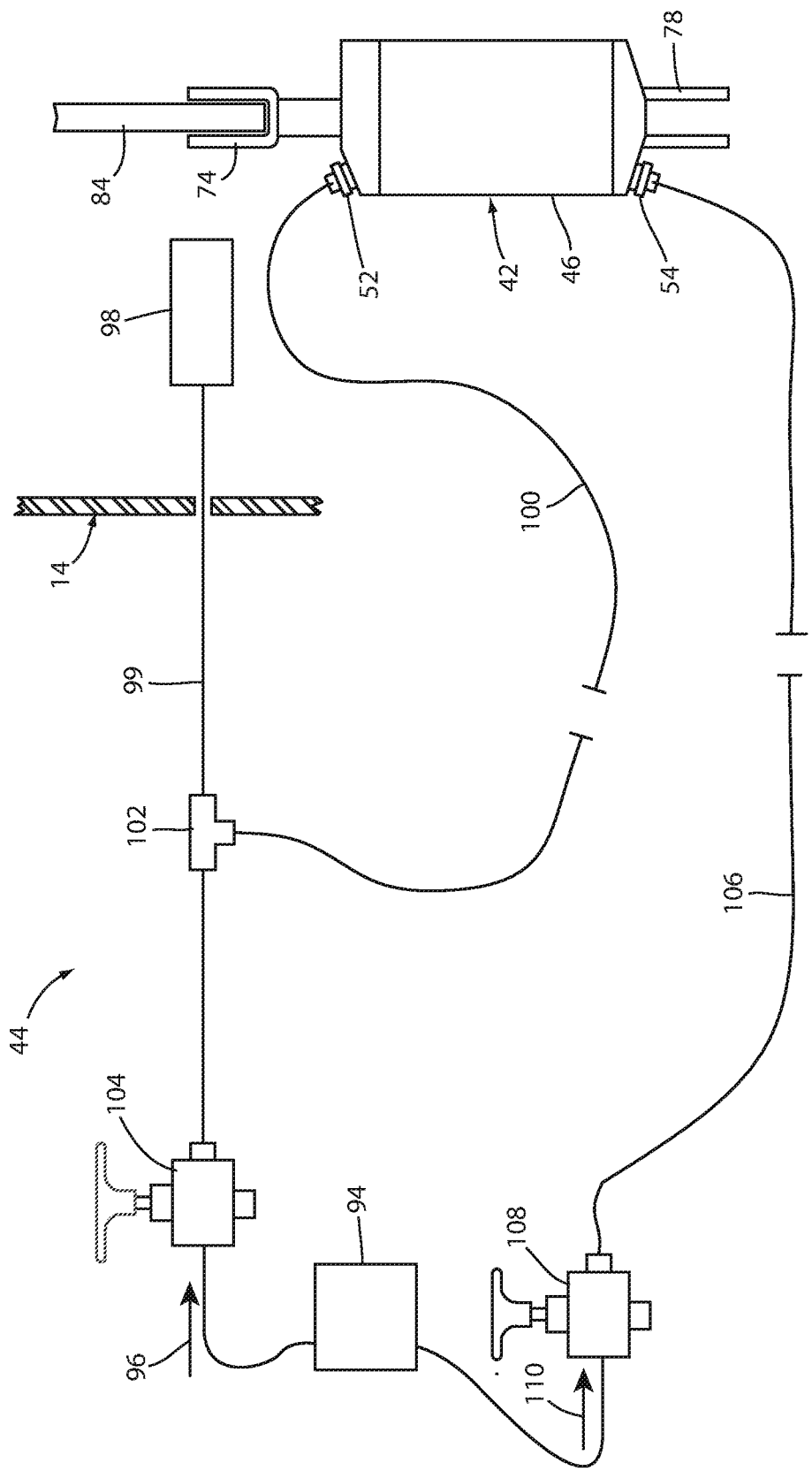
FIG. 5 is a schematic view of the fifth wheel safety coupling arrangement.

The fifth wheel assembly 22 further includes a locking arrangement 38 (FIG. 3) moveable between a locked position A (FIG. 3), wherein the kingpin 36 is secured within the throat 34 of the hitch plate 24, and an unlocked position B (FIG. 4), wherein the kingpin 36 may be moved into and removed from the throat 34 of the hitch plate 24 as further described below. The locking arrangement 38 may be configured to move between the locked position A and the unlocked position B either manually via an engagement/release handle in a manner well known in the art, and/or via a mechanical assistance, such as via a pneumatic cylinder assembly 42 that is part of the overall fifth wheel assembly safety coupling arrangement 44 (FIG. 5). Of course, other automatic or mechanically assisted systems could also be utilized in connection with the cylinder assembly 42, such as electric actuators, various gear trains and the like.

Figure 6:
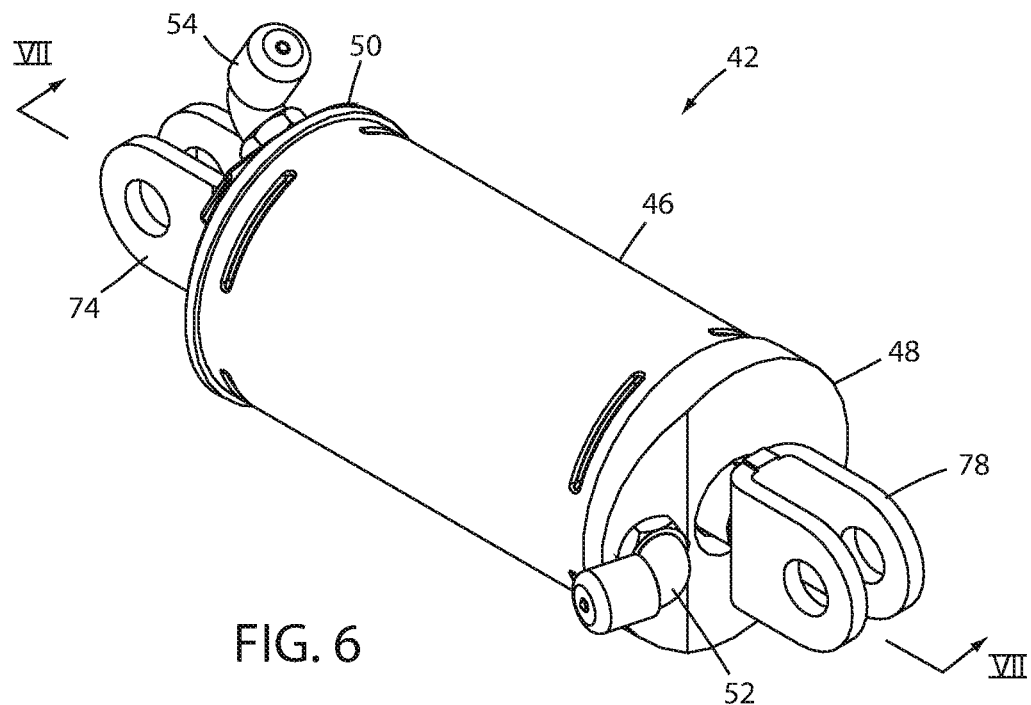
FIG. 6 is a perspective view of a pneumatic cylinder assembly.
Figure 7:
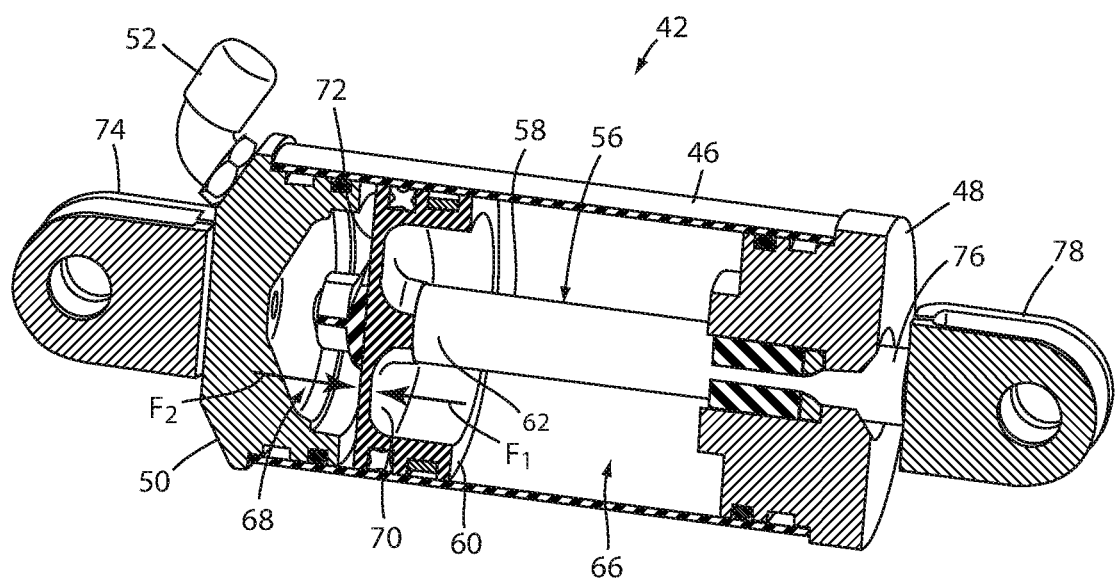
FIG. 7 is a cross-sectional perspective view of the pneumatic cylinder assembly taken along the line VII-VII, FIG. 6.

The pneumatic cylinder assembly 42 (FIGS. 6 and 7) of the fifth wheel assembly safety coupling arrangement 44 includes a cylindrical housing 46, a first end cap 48 and a second end cap 50. A first inlet 52 is located within the first end cap 48 while a second inlet 54 is located within the second end cap 50. The cylinder assembly 42 further includes a piston assembly 56 that includes a piston shaft 58 and a piston head 60 attached to a first end 62 of the piston shaft 58. The piston head 60 divides the housing 46 into a first air chamber 66 and a second air chamber 68. In the illustrated example, the piston head 60 includes a first head surface 70 facing the first air chamber 66, and a second head surface 72 facing the second air chamber 68. A first clevis member 74 is fixedly attached to the second end cap 50, while a second clevis member 78 is attached to a second end of the piston shaft 58.

Figure 3:
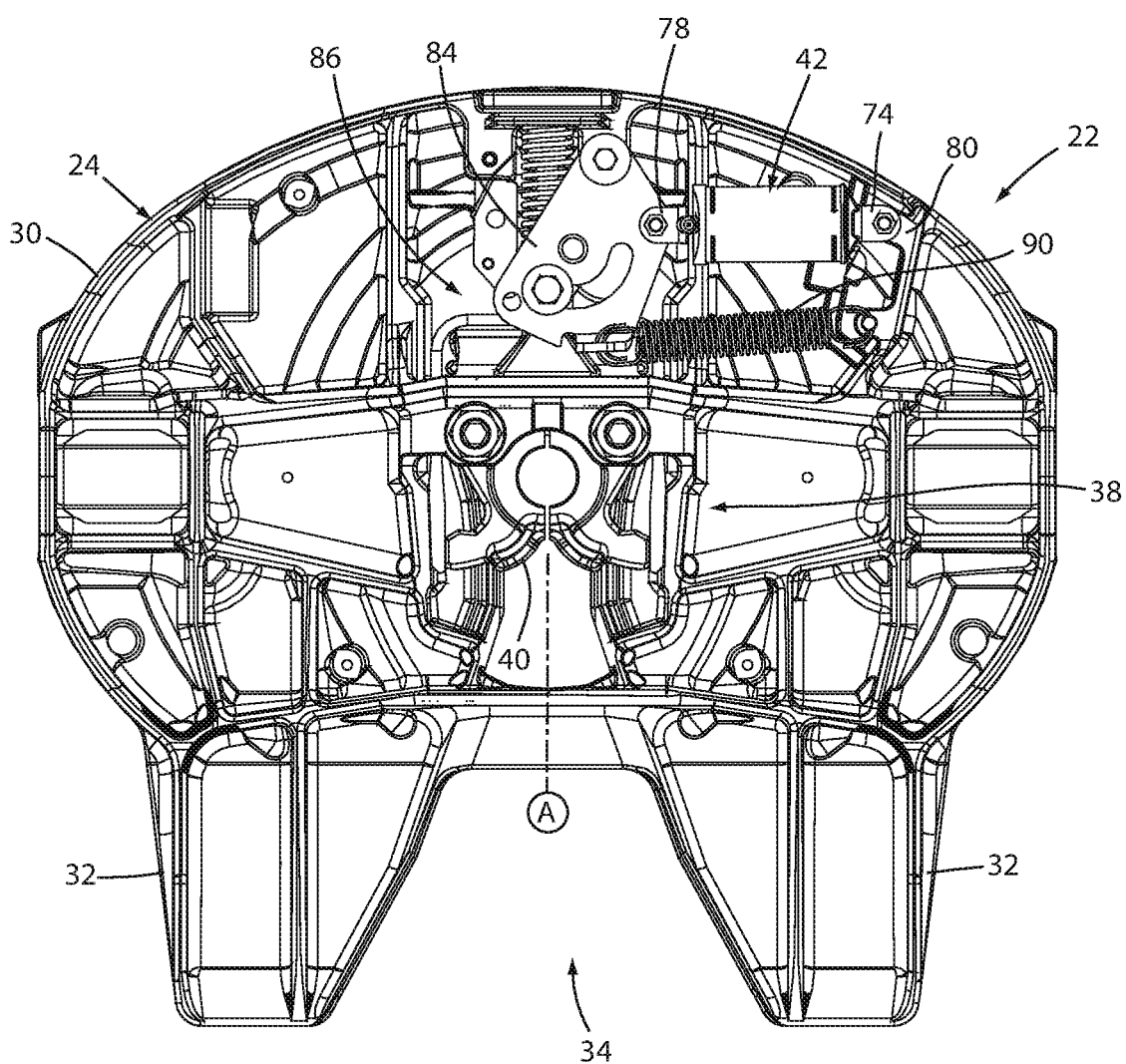
FIG. 3 is a bottom plan view of the fifth wheel hitch plate assembly with a locking arrangement in a locked position.
Figure 8:
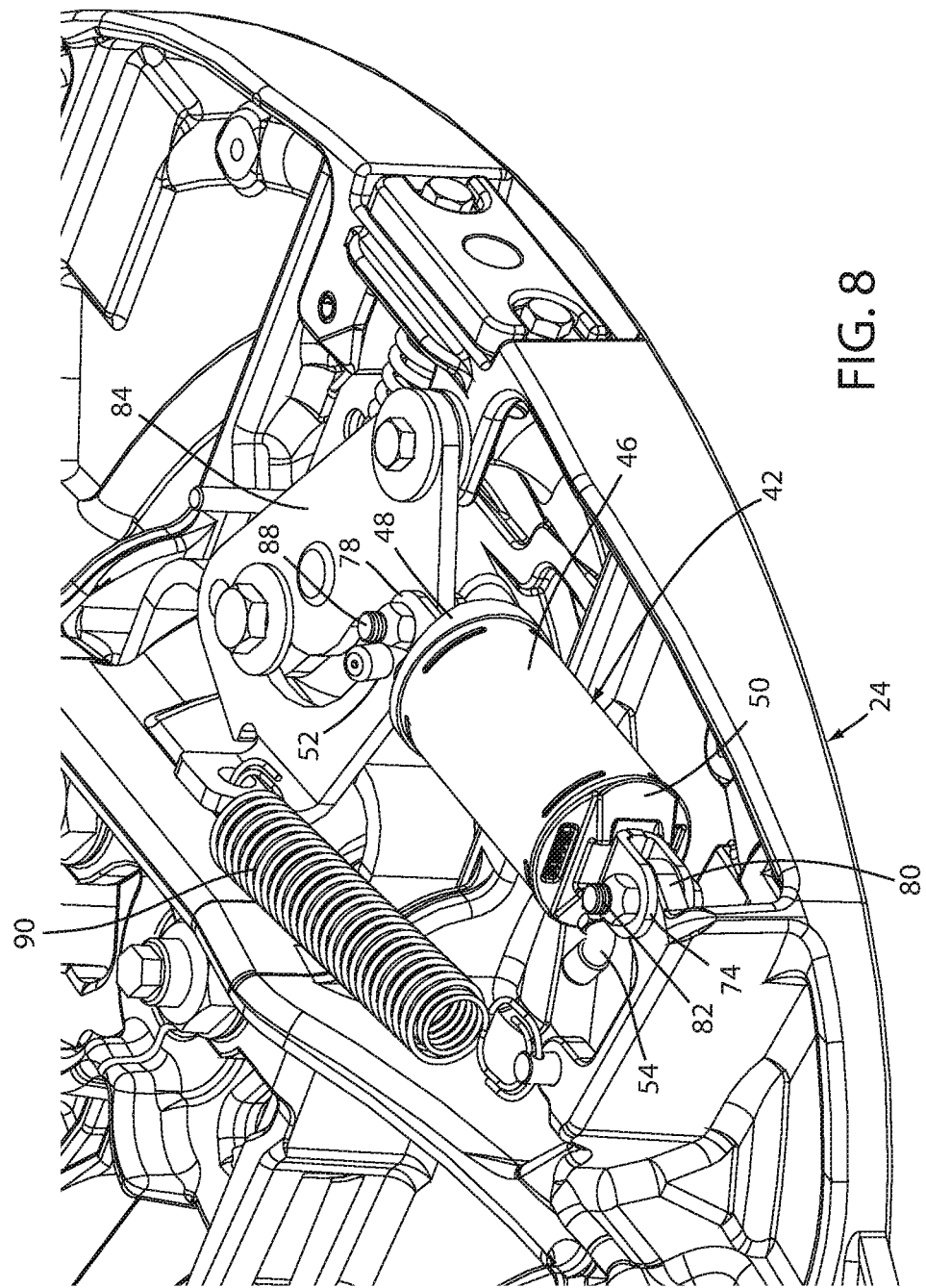
FIG. 8 is and enlarged perspective view of the fifth wheel hitch plate assembly.

As best illustrated in FIGS. 3 and 8, the first clevis member 74 is attached to a mounting tab 80 integral with the fifth wheel hitch plate 24 via a mechanical fastener such as a bolt 82, while the second clevis member 78 is operably coupled to a cam plate 84 of a mechanical-linkage actuator assembly 86 by a mechanical fastener such as a bolt 88, wherein the actuator assembly 86 mechanically links the cylinder assembly 42 with the locking arrangement 38 in a manner as well known in the art. A biasing arrangement such as a coil spring 90 extends between the fifth wheel hitch plate 24 and the cam plate 84 and biases the cam plate 84 and exerts a biasing force on the locking arrangement 38 from the unlocked position B toward the locked position A.

Figure 9:
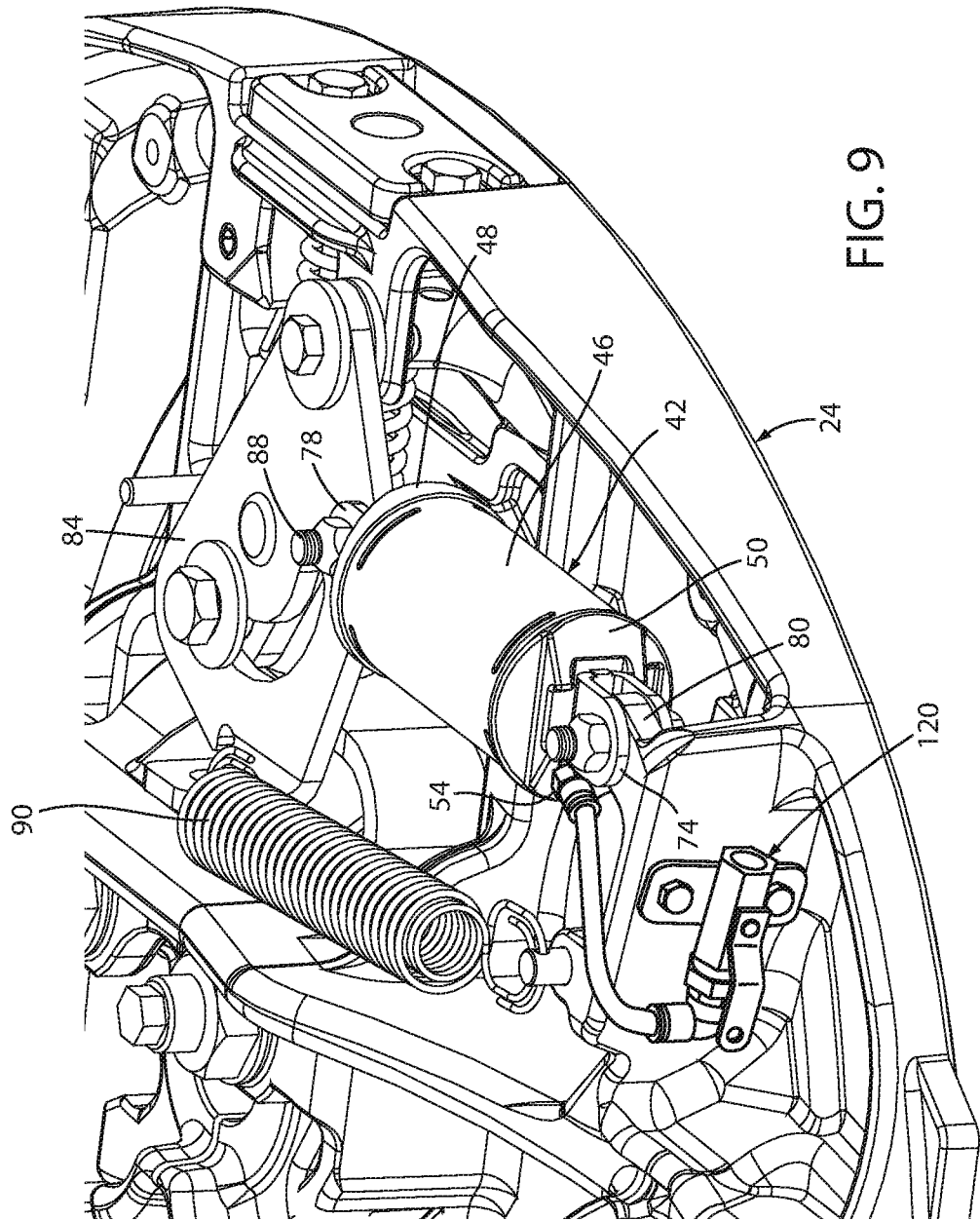
FIG. 9 is an enlarged perspective view of an alternative embodiment of the fifth wheel hitch plate assembly.

As best illustrated in FIG. 5, the fifth wheel assembly safety coupling arrangement 44 includes an air source 94 associated with the towing vehicle 12 and including an air tank, an air compressor, and the like. The air source 94 provides a first air supply 96 pneumatically coupled to a vehicle air brake system 98 associated with the trailer 14, wherein the air brake system 98 is configured such that a positive first air supply 96 opens the air brake system, or moves the air brake system 98 from a locked position to an unlocked position as is well known in the art. A first air cylinder supply line 100 is pneumatically coupled to the air brake supply line 99 via a pneumatic T-member 102, and to the first inlet 52 of the cylinder assembly 42. A break actuator valve 104 may be located between the air source 94 and the air brake system 98 and the air cylinder supply line 100, and may be located within the interior space 18 of the cab 16. The fifth wheel assembly safety coupling arrangement 44 may further include a fifth wheel lock release supply line 106 pneumatically coupling the air source 94 within the second inlet 54 of the cylinder assembly 42. In the instant example, the fifth wheel assembly safety coupling arrangement 44 further includes a remote actuator 108 positioned within the interior space 18 of the cab 16, and configured so that the vehicle operator may select to supply a second air supply 110 to the supply line 106. In an alternative embodiment, the fifth wheel safety coupling arrangement 44 (FIG. 9) may further include a shut off valve 120 configured to manually cut off air flow from the fifth wheel lock release supply line 106 to the cylinder assembly 42, thereby preventing the cylinder assembly 42 from moving the lock arrangement 38 from the locked position A to the unlocked position B.

In operation, the air supply 96 is supplied to the first inlet 52 and the first air chamber 66 of the cylinder assembly 42 when the air brake system 98 is attached to the towing vehicle. The first air supply 96 exerts a first force $F_1$ on the first head surface 70 of the piston head 60, thereby forcing the cylinder assembly 42 into the closed or locked position as illustrated in FIG. 3, thereby forcing the locking arrangement 38 into the locked position A and preventing the kingpin 36 from being removed from within the throat 38 of the fifth wheel hitch plate 24. When attempting to uncouple the trailer 14 from the towing vehicle 12, the vehicle operator may actuate the actuator 108 so as to allow the second air supply 110 to be received by the supply line 106, the second inlet 54 and the second air chamber 68, thereby exerting a force $F_2$ on the second head surface 72 of the piston head 60, and forcing the cylinder assembly 42 into the open or unlocked position as illustrated in FIG. 4, and the locking arrangement 38 into the unlocked position B when the force $F_2$ is greater than the sum of the biasing force exerted by the biasing arrangement and the force $F_1$. However, in order to prevent unintentional uncoupling of the trailer 14 from the towing vehicle 12, the fifth wheel assembly safety coupling arrangement 44 is configured such that the second air supply 110 cannot move the cylinder assembly 42 from the closed position to the open position if the first inlet 52 continues to receive the first air supply 96. In order to overcome the fifth wheel assembly safety coupling arrangement 44, the operator must disconnect the air brake supply line 99 from the air source 94, or at least interrupt the first air supply 96 by use of the brake actuator valve 104, such that the force $F_2$ exerted on the piston assembly 46 is greater than the sum of the biasing force exerted by the biasing arrangement and the force $F_1$.

The present inventive system for ensuring proper coupling of the towed vehicle to the towing vehicle significantly reduces the chance of an accidental uncoupling of the towed vehicle from the towing vehicle. This system may be easily retrofitted onto most vehicle configurations, is extremely reliable and durable, is capable of a long operating life, and is particularly well adapted for the proposed use.

In the foregoing description, it will be readily appreciated of those skilled in the art that modifications may be made to the embodiments as disclosed herein without departing from the concepts as also disclosed herein. Such modifications are to be considered as included in the following claims, unless these claims by their language expressly state otherwise.

The invention claimed is:

1. A fifth wheel assembly safety coupling arrangement, comprising:
    a fifth wheel hitch member including a top support surface and a recess configured to receive a kingpin member therein;
    a locking arrangement moveable between a locked position, wherein the kingpin is prevented from being removed from within the recess by the locking arrangement, and an unlocked position, wherein the kingpin is not prevented from being removed from within the recess by the locking arrangement;
    a biasing arrangement exerting a biasing force on the locking arrangement from the unlocked position toward the locked position; and
    a pneumatic cylinder assembly configured to receive a first pneumatic input from a first air supply exerting a first force on the pneumatic cylinder assembly, and a second pneumatic input from a second air supply exerting a second force on the pneumatic cylinder assembly, wherein the pneumatic cylinder assembly prevents the locking arrangement from moving from the locked position to the unlocked position when the sum of the first force and the biasing force is greater than the second force.

2. The fifth wheel assembly safety coupling arrangement of claim 1, wherein the first air supply is in pneumatic communication with a brake arrangement, and the second air supply is selectively operated by a vehicle operator.

3. The fifth wheel assembly safety coupling arrangement of claim 2, wherein the pneumatic cylinder assembly is operably coupled to the locking arrangement by an actuator assembly.

4. The fifth wheel assembly safety coupling arrangement of claim 3, further comprising:
a shut-off valve operable between an open position where the second air supply is in fluid communication with the pneumatic cylinder and a closed position wherein fluid communication between the second air supply and the pneumatic cylinder is prevented.

5. The fifth wheel assembly safety coupling arrangement of claim 3, wherein the pneumatic cylinder moves the locking arrangement from the locked position to the unlocked position when the second force is greater than the sum of the first force and the biasing force.

6. The fifth wheel assembly safety coupling arrangement of claim 1, wherein the pneumatic cylinder assembly is operably coupled to the locking arrangement by an actuator assembly.

7. The fifth wheel assembly safety coupling arrangement of claim 6, wherein the pneumatic cylinder assembly is operably coupled to a cam plate of the actuator assembly.

8. The fifth wheel assembly safety coupling arrangement of claim 1, further comprising:
a shut-off valve operable between an open position where the second air supply is in fluid communication with the pneumatic cylinder and a closed position wherein fluid communication between the second air supply and the pneumatic cylinder is prevented.

9. The fifth wheel assembly safety coupling arrangement of claim 1, wherein the pneumatic cylinder moves the locking arrangement from the locked position to the unlocked position when the second force is greater than the sum of the first force and the biasing force.

10. The fifth wheel assembly safety coupling arrangement of claim 9, wherein the biasing arrangement includes a spring member biasing the locking arrangement from the unlocked position toward the locked position.

11. A fifth wheel assembly safety arrangement, comprising:
a fifth wheel hitch plate including a top support surface and a recess configured to receive a kingpin member therein;
a locking arrangement moveable between a locked position, wherein the kingpin is prevented from being removed from within the recess by the locking arrangement, and an unlocked position, wherein the kingpin is not prevented from being removed from within the recess by the locking arrangement;
a biasing arrangement exerting a biasing force on the locking arrangement from the unlocked position toward the locked position;
a second air supply;
a first air supply in fluid communication with a brake arrangement of a towed vehicle; and
a pneumatic cylinder assembly receiving a first pneumatic input from the first air supply exerting a first force on the pneumatic cylinder assembly, and a second pneumatic input from the second air supply exerting a second force on the pneumatic cylinder assembly, wherein the pneumatic cylinder assembly prevents the locking arrangement from moving from the locked position to the unlocked position when the sum of the biasing force and the first force is greater than the second force.

12. The fifth wheel assembly safety coupling arrangement of claim 11, wherein the first air supply is in pneumatic communication with a brake arrangement, and the second air supply is selectively operated by a vehicle operator.

13. The fifth wheel assembly safety coupling arrangement of claim 11, wherein the pneumatic cylinder assembly is operably coupled to the locking arrangement by an actuator assembly.

14. The fifth wheel assembly safety coupling arrangement of claim 11, further comprising:
a shut-off valve operable between an open position where the second air supply is in fluid communication with the pneumatic cylinder and a closed position wherein fluid communication between the second air supply and the pneumatic cylinder is prevented.

15. The fifth wheel assembly safety coupling arrangement of claim 11, wherein the pneumatic cylinder moves the locking arrangement from the locked position to the unlocked position when the second force is greater than the sum of the biasing force and the first force.

16. The fifth wheel assembly safety coupling arrangement of claim 11, wherein the biasing arrangement includes a spring member biasing the locking arrangement from the unlocked position toward the locked position.

* * * * *